United States Patent
Collmer (10) Patent No.: US 11,162,707 B2
(45) Date of Patent: Nov. 2, 2021

(54) FLOW RESTRICTOR ELEMENT, ESPECIALLY FOR RESTRICTING AIR FLOW IN AN AIR DUCT SYSTEM OF A VEHICLE

(71) Applicant: Eberspächer Climate Control Systems GmbH & Co. KG, Esslingen (DE)

(72) Inventor: Andreas Collmer, Aichwald (DE)

(73) Assignee: EBERSPÄCHER CLIMATE CONTROL SYSTEMS GMBH, Esslingen am Neckar (DE)

( * ) Notice: Subject to any disclaimer, the term of this patent is extended or adjusted under 35 U.S.C. 154(b) by 1090 days.

(21) Appl. No.: 14/455,274

(22) Filed: Aug. 8, 2014

(65) Prior Publication Data
US 2015/0050874 A1    Feb. 19, 2015

(30) Foreign Application Priority Data

Aug. 14, 2013  (DE) ..................... 10 2013 216 127.1

(51) Int. Cl.
  *F24F 13/02*   (2006.01)
  *B60H 1/00*    (2006.01)
  (Continued)

(52) U.S. Cl.
  CPC ..... *F24F 13/0209* (2013.01); *B60H 1/00564* (2013.01); *F16L 55/02718* (2013.01); *F24F 13/02* (2013.01); *F24F 13/08* (2013.01)

(58) Field of Classification Search
  CPC ........ F24F 13/14; F24F 13/0209; F24F 13/00; F24F 13/08; F24F 13/02; G01F 1/40; F16L 55/02718; B60H 1/00564
  (Continued)

(56) References Cited

U.S. PATENT DOCUMENTS

| | | | | |
|---|---|---|---|---|
| 323,300 A | * | 7/1885 | Dorneck | ................... F24F 7/00 454/270 |
| 2,341,439 A | * | 2/1944 | Greenlaw | ............. F24F 13/062 454/310 |

(Continued)

FOREIGN PATENT DOCUMENTS

| | | |
|---|---|---|
| CN | 1229174 A | 9/1999 |
| CN | 201106730 Y | 8/2008 |

(Continued)

OTHER PUBLICATIONS

"Machine Translation of DE3013147A1". 2020.*
Chinese Office Action dated Jan. 19, 2016 in English.

*Primary Examiner* — Vivek K Shirsat
(74) *Attorney, Agent, or Firm* — McGlew and Tuttle, P.C.

(57) ABSTRACT

A flow restrictor element, especially for restricting the air flow in an air duct system of a vehicle, comprises a ring-shaped restrictor element carrier (12) to be arranged on a flow guide duct as well as at least one restrictor element (28). The at least one restrictor element (28) is arranged within the restrictor element carrier (12), radially inwardly in relation to a central axis (M) of the flow restrictor element (10) and is detachable from the restrictor element carrier (12) for changing a restriction cross-sectional area, wherein a locking device (16) is provided on an outer circumferential area (14) of the restrictor element carrier (12) for locking the restrictor element carrier (12) on a flow guide duct.

20 Claims, 9 Drawing Sheets

(51) Int. Cl.
*F24F 13/08* (2006.01)
*F16L 55/027* (2006.01)

(58) Field of Classification Search
USPC ........................................................ 454/143
See application file for complete search history.

(56) References Cited

U.S. PATENT DOCUMENTS

| | | | | |
|---|---|---|---|---|
| 2,861,510 A * | 11/1958 | Wulle | ................... | F24F 13/068 285/318 |
| 2,882,993 A * | 4/1959 | Murty | ............... | F16L 55/02718 181/281 |
| 3,367,325 A * | 2/1968 | O'Keefe | .............. | A61H 33/025 4/559 |
| 3,403,615 A * | 10/1968 | Dayus | .................... | F24F 13/06 454/309 |
| 3,432,108 A * | 3/1969 | Enright | ................... | B02C 23/00 241/100 |
| 3,529,391 A * | 9/1970 | Van Laethem | ......... | F24F 13/08 52/656.8 |
| 3,547,152 A * | 12/1970 | Hess | ....................... | F24F 13/10 137/601.06 |
| 4,053,082 A * | 10/1977 | Ullman | .................. | H02G 3/123 220/3.6 |
| 4,214,511 A * | 7/1980 | Mueller | ................. | B65D 90/36 454/182 |
| 4,407,187 A * | 10/1983 | Horney | ................. | F24F 13/085 454/324 |
| 4,445,426 A * | 5/1984 | Bohanon, Sr. | .......... | F24F 7/013 454/351 |
| 4,473,000 A * | 9/1984 | Perkins | ................. | F04D 25/088 454/299 |
| 4,989,456 A * | 2/1991 | Stupecky | ............. | A61B 5/0876 138/46 |
| 5,649,860 A * | 7/1997 | Giuffrida | ............... | F24F 13/02 239/533.13 |
| 5,897,434 A * | 4/1999 | Arbucci | ................... | F23J 13/08 454/12 |
| 5,931,432 A * | 8/1999 | Herold | ................... | F21V 21/04 248/343 |
| 5,979,247 A * | 11/1999 | Kizawa | ..................... | G01F 1/42 73/861.53 |
| 6,050,892 A * | 4/2000 | Sodec | ..................... | F24F 13/06 454/289 |
| 6,083,100 A * | 7/2000 | Hardy | ................... | F24F 13/068 454/290 |
| 6,478,673 B1 * | 11/2002 | Haynes | ................... | F24F 13/06 285/319 |
| 6,655,207 B1 * | 12/2003 | Speldrich | ............... | G01F 1/40 73/202.5 |
| 6,872,073 B2 * | 3/2005 | Collmer | ................. | F23D 11/404 431/261 |
| 6,929,467 B2 * | 8/2005 | Blaschke | ................. | F23D 3/40 126/116 R |
| 6,957,896 B2 * | 10/2005 | Burgess | .................. | F21V 21/04 362/147 |
| 6,984,170 B2 * | 1/2006 | Schlecht | ............ | B60H 1/00028 165/41 |
| 7,213,290 B2 * | 5/2007 | Martin | ................... | B05B 5/1616 118/105 |
| 7,320,638 B2 * | 1/2008 | Craig | ....................... | F24F 7/10 454/290 |
| 7,434,746 B2 * | 10/2008 | Schlecht | .............. | B60H 1/2203 165/41 |
| 7,442,120 B2 * | 10/2008 | Poirier | .................... | F16L 37/26 285/325 |
| 7,497,772 B2 * | 3/2009 | Laib | ....................... | F16L 41/082 138/44 |
| 7,530,705 B2 * | 5/2009 | Czech | ....................... | F21S 8/02 248/288.11 |
| 7,677,884 B2 * | 3/2010 | Kaupert | .................. | F23D 14/22 431/160 |
| 7,780,135 B2 * | 8/2010 | Nelson | ................... | H04R 1/025 181/150 |
| 7,828,640 B2 * | 11/2010 | Liang | .................. | F04D 29/4226 454/76 |
| 7,841,843 B2 * | 11/2010 | Cho | .......................... | F04F 7/00 417/413.1 |
| 8,539,784 B2 * | 9/2013 | Heuer | .................... | B64D 13/00 454/297 |
| 8,671,495 B2 * | 3/2014 | Martin | ................ | B05B 12/1481 15/104.03 |
| D707,341 S * | 6/2014 | Alfakhrany | .................. | D23/388 |
| 8,833,013 B2 * | 9/2014 | Harman | .................. | F24F 13/02 52/220.8 |
| 8,875,593 B2 * | 11/2014 | Collmer | ............... | B25J 19/0029 118/323 |
| 8,876,582 B2 * | 11/2014 | Gao | ......................... | F24F 7/007 454/341 |
| 9,028,309 B2 * | 5/2015 | Rimmer | .................. | F24F 13/06 454/289 |
| 9,290,079 B2 * | 3/2016 | Collmer | .................... | F23C 3/00 |
| 9,388,818 B2 * | 7/2016 | Wetzl | .................... | F04D 23/008 |
| 9,636,972 B2 * | 5/2017 | Haefner | ................... | B60H 1/02 |
| 2003/0107207 A1 * | 6/2003 | Elqadah | ............... | B60R 21/2035 280/735 |
| 2005/0072891 A1 * | 4/2005 | Wright | .................... | B25B 13/46 248/342 |
| 2007/0015455 A1 * | 1/2007 | Knight | .................. | F24F 1/0007 454/292 |
| 2007/0131296 A1 * | 6/2007 | Schinazi | ............... | A61M 5/141 138/43 |
| 2007/0238408 A1 * | 10/2007 | Taylor | ............... | E04F 15/02458 454/186 |
| 2009/0061757 A1 * | 3/2009 | Rimmer | ................ | F24F 13/06 454/290 |
| 2011/0086588 A1 * | 4/2011 | Demma | ............... | B60H 1/3421 454/162 |
| 2011/0174408 A1 * | 7/2011 | Lundberg | ................ | B01F 5/0616 138/39 |
| 2016/0356521 A1 * | 12/2016 | Bertini | .................. | F24F 13/029 |

FOREIGN PATENT DOCUMENTS

| | | | |
|---|---|---|---|
| CN | 102758986 A | 10/2012 | |
| DE | 3013147 A1 * | 10/1981 | ............ F24F 13/078 |
| DE | 30 13 147 C2 | 2/1983 | |
| DE | 2 98 156 A5 | 2/1992 | |
| DE | 10 2007 001052 A1 | 7/2008 | |
| DE | 10 2012 208935 A1 | 12/2013 | |
| GB | 1119559 A | 7/1968 | |

* cited by examiner

FLOW RESTRICTOR ELEMENT, ESPECIALLY FOR RESTRICTING AIR FLOW IN AN AIR DUCT SYSTEM OF A VEHICLE

CROSS REFERENCE TO RELATED APPLICATIONS

This application claims the benefit of priority under 35 U.S.C. § 119 of German Patent Application DE 10 2013 216 127.1 filed Aug. 14, 2013, the entire contents of which are incorporated herein by reference.

FIELD OF THE INVENTION

The present invention pertains to a flow restrictor element, which can be used, for example, to generate a flow restriction in an air duct system of a vehicle.

BACKGROUND OF THE INVENTION

A flow restrictor element, which comprises a restrictor element carrier with a plurality of carrier struts extending starting from a central connection area, is known from the subsequently published German Patent Application DE 10 2012 208 935. These carrier struts, arranged in a cross-shaped or star-shaped configuration in relation to one another, are designed to be mounted on a duct wall of a flow duct at their free end area located at a distance from the central connection area. The carrier struts have a locking formation for this, which can be caused to lockingly mesh with an opposite locking formation on the flow guide duct or the wall thereof, so that the restrictor element carrier or the flow restrictor element is held at the inner circumferential wall of the flow duct and can contribute to a defined restriction thereof. Restrictor element mounting areas are formed between mutually adjacent carrier struts, and a restrictor element detachably connected with at least one such restrictor element carrier is provided in at least one such restrictor element mounting area. The detachable connection may be provided by a plurality of destructible connection webs, so that one such restrictor element or a plurality of such restrictor elements can be removed to generate a defined restriction cross section by destroying these connection webs connected to the restrictor element carrier. Circumferential areas, into which the air being guided in the flow duct can flow, can the formed in this manner in the restrictor element provided, in general, in a disk-like shape, while other circumferential areas may be provided, in which a restrictor element was not detached from the restrictor element carrier and the passage in air is essentially not possible.

DE 10 2007 001 052 A1 discloses a flow restrictor element of a disk-shaped design with a plurality of passage openings formed therein. A locking device, which can be caused to mesh with a groove-like opposite locking device formed on the flow duct in order to generate a holding action by pushing in the flow restrictor element laterally in relation to the direction of flow, is formed at the outer circumferential area of this disk-shaped flow restrictor element.

U.S. Pat. No. 7,497,772 B2 discloses a disk-shaped flow restrictor element with a passage opening or with a plurality of passage openings formed therein. A slot-like insertion opening, which is open at right angles to the longitudinal direction of the flow duct, and into which the flow restrictor element can be inserted, is formed on the duct wall of a flow duct. An outer circumferential area of the flow restrictor element is held in this slot-like insertion opening and is secured by a securing pin against falling out laterally.

DD 298 156 A5 discloses a flow restrictor element of a disk-shaped design, which is arranged between two plate-like components of an air inlet of an individual fan in the direction of flow. A plurality of passage openings are provided in the flow restrictor element.

SUMMARY OF THE INVENTION

An object of the present invention is to provide a flow restrictor element, especially for restricting the air flow in an air duct system of a vehicle, with which a restriction cross-sectional area can be adapted in a simple manner and improved flow characteristics can be achieved in a flow guide duct.

This object is accomplished according to the present invention by a flow restrictor element, especially for restricting the air flow in an air duct system of a vehicle, comprising a ring-shaped restrictor element carrier to be arranged at the flow guide duct as well as at least one restrictor element, which is arranged radially within the restrictor element carrier in relation to a central axis of the flow restrictor element or of the restrictor element carrier and is detachable from the restrictor element carrier to change a restriction cross-sectional area, wherein a locking device is provided at an outer circumferential area of the restrictor element carrier for locking the restrictor element carrier at a flow guide duct.

In a flow restrictor element designed according to the present invention, the restrictor element carrier forms essentially the radially outermost area and can also contribute to the flow restriction in this area. A variable flow cross section is provided in an area radially within the restrictor element carrier. This means that the change in the restriction cross-sectional area is brought about by releasing or not releasing surface areas located in a radially staggered manner, which permits an essentially central or symmetrical flow through a flow duct. Contrary to this, cross-sectional area segments located staggered essentially in the circumferential direction are released for flow or are blocked against flow in the embodiment of a flow restrictor element known from DE 10 2012 208 935, which leads, in general, to an asymmetrical flow through a flow duct. Symmetrical or central flow through a flow duct is especially significant especially if this duct is defined by an air discharge unit, for example, with a plurality of discharge lamellae and leads, for example, into the interior space of a vehicle. The air discharge unit can be used uniformly due to the central arrival of the flow essentially in its entire surface area available for the discharge, because the flow can arrive in the embodiment of a flow restrictor element according to the present invention centrally and not only in certain circumferential areas. The uniform arrival of flow and even the uniform utilization of the discharge area provided by such an air discharge unit is especially advantageous especially if the air flow is deflected by such an air discharge unit or the direction of discharge is variable, because it can thus be guaranteed that the air discharge unit, to which the flow arrives essentially centrally or over the entire area thereof, can deflect or guide the air in the direction to be preset by this unit.

To achieve uniform and stable connection of the flow restrictor element to an assembly unit carrying same, it is proposed that the locking device comprises a plurality of locking projections, preferably snap-in projections extending from the restrictor element carrier, wherein the locking projections have a locking meshing (engagement) area to be positioned such that it meshes with a locking recess on a side thereof that is to be positioned facing a flow guide duct, and wherein the locking projections can extend from an outer edge area of the restrictor element carrier radially outwardly and/or in the direction of the central axis.

Adapting to the generally rounded cross-sectional shape of flow ducts, it is proposed, to achieve efficient restriction, on the one hand, and to make stable connection possible, on the other hand, that the restrictor element carrier be designed, in at least some areas, with a rounded ring shape, preferably in the shape of a circular ring, with an elliptical shape or an oval shape. It should be noted in this connection that various shapes of this type can, of course, be combined. Thus, the restrictor element carrier may be in the shape of a circular ring in some areas and have an elliptical shape in another area, and possibly an oval shape in yet another area. Such rounded ring-shaped areas may also be combined with areas of the restrictor element carrier in which the latter has, for example, an angular circumferential contour for adaptation to a corresponding shape of a flow duct. It should also be noted that a ring-shaped design of the restrictor element carrier can also be obtained by a polygonal shape thereof.

To make it possible to achieve a greater variability of the restriction cross-sectional area, it is proposed that a plurality of restrictor elements arranged in a radially staggered manner be provided, wherein the radially outermost restrictor element is detachably connected with the restrictor element carrier and each additional restrictor element positioned radially on the inside is detachably connected with a restrictor element adjacent thereto radially on the outside.

In adaptation to the shape or design of the restrictor element carrier, it is proposed that at least one restrictor element be ring-shaped, preferably with essentially the same ring-shaped design as the restrictor element carrier.

A possibility of varying the restriction cross-sectional area even more finely can be advantageously achieved by at least one restrictor element comprising a plurality of restrictor element segments following each other about the central axis in the circumferential direction, wherein the restrictor element segments of one restrictor element are detachably connected with the restrictor element carrier or/and with another restrictor element or/and with at least one additional restrictor element segment independently from one another.

The detachable connection of restrictor elements with one another or/and with the restrictor element carrier can be achieved in an especially simple manner by at least one restrictor element being connected detachably with the restrictor element carrier or/and with an additional restrictor element or/and with at least one additional restrictor element segment by at least one connection web. In particular, provisions may be made for at least one connection web to be destructible for detaching a restrictor element. The connection web consequently forms a predetermined breaking point, which permits easy detachment, on the one hand, and guarantees, on the other hand, that other areas of the restrictor element carrier or of a restrictor element will not be damaged during detachment.

To facilitate the destruction of such a connection web, it is proposed that at least one cutting tool insertion opening be provided associated with the at least one connection web, preferably one cutting tool insertion opening each on both sides thereof. It thus becomes possible to insert, for example, pliers into the cutting tool insertion openings and to cut a connection web.

For example, provisions may be made for at least one cutting tool insertion opening to be provided by an expansion of an intermediate space separating a restrictor element from the restrictor element carrier. For example, at least one cutting tool insertion opening can be provided in an especially simple manner by an intermediate space, which separates a restrictor element from another restrictor element or from the restrictor element carrier, being provided at a connection web.

To detach a restrictor element or a restrictor element segment in a simple manner, it is proposed that at least one restrictor element or restrictor element segment be connected with a restrictor element carrier or/and with another restrictor element by at least one connection web with a cutting tool insertion opening associated therewith and by at least one connection web without a cutting tool insertion opening associated therewith. A connection web with an associated cutting tool insertion opening can be destroyed (cut through or broken apart) first by cutting by means of a cutting tool. The restrictor element or restrictor element segment can then be rotated in relation to the restrictor element carrier or another restrictor element in order to also destroy the connection web, with which no cutting tool insertion opening is associated.

It is proposed in an especially advantageous embodiment that two connection webs with a cutting tool insertion opening each associated therewith be provided, associated with at least one restrictor element, essentially diametrically opposite each other and that two connection webs without these openings be provided essentially diametrically opposite each other.

The flow restrictor element designed according to the present invention can be provided in an especially simple manner by the restrictor element carrier being made integrally with at least one restrictor element and at least one connection web, preferably also with a locking device, preferably made of a plastic material.

The restrictor element carrier may have an essentially disk-shaped design with at least one restrictor element. Further, it is proposed, to achieve central flow through a flow duct, that the restrictor element carrier and at least one restrictor element detachably connected with same be arranged concentrically to the central axis.

According to another aspect, the present invention pertains to a flow restrictor element, especially for restricting the air flow in an air duct system of a vehicle, comprising a ring-shaped restrictor element body to be arranged on a flow guide duct, wherein a locking device for locking the restrictor element body on a flow guide duct is provided on an outer circumferential area of the restrictor element body.

Restriction of a flow guide duct, which restriction is defined by the selection of the side of the flow restrictor element, can be brought about with such a ring-shaped flow restrictor element, and the flow through the flow guide duct takes place essentially centrally because of the ring-shaped design.

Provisions may now be made for the locking device to comprise a plurality of locking projections, preferably snap-in projections, extending from the restrictor element body, and the locking projections preferably have a locking meshing area to be positioned such that they mesh with a locking recess on a side thereof that is to be positioned facing a flow guide duct. A stable, but easy-to-establish fixation of the flow restrictor element can be achieved in this manner.

The locking projections may be arranged such that they extend from an outer edge area of the restrictor element body radially outwardly or/and in the direction of a central axis of the restrictor element body. This central axis may essentially also correspond to the direction of flow of air flowing through from the restrictor element body in the opening provided preferably centrally therein.

According to an advantageous aspect, the restrictor element body may have a rounded ring shape, preferably a ring shape, elliptical or oval shape, at least in some areas.

The present invention pertains, furthermore, to an air duct system, especially for a vehicle, comprising a flow duct with a duct wall surrounding a flow space, wherein at least one opposite locking device is provided on the duct wall for locking meshing with a locking device of a flow restrictor element according to the present invention, and at least one such flow restrictor element is held with an opposite locking device on an inner side of the duct wall by the locking meshing of a locking device.

The air duct system may be designed, for example, such that the flow duct comprises a duct connection, which is to be fixed on a support structure, preferably a wall, and provides the duct wall with the opposite locking device. Such a duct connection may define, for example, a discharge area of the air duct system or be provided there, and a discharge element, preferably with at least one flow guide element, for example, lamella or the like, may advantageously be provided on the duct connection.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, FIGS. 1 through 4 show a first type of embodiment of a flow restrictor element generally designated by 10. This flow restrictor element 10 may be used in a flow duct of an air duct system in a vehicle for generating a defined air flow restriction.

The flow restrictor element 10 comprises a restrictor element carrier 12 of a ring-shaped design. This carrier is designed as a closed circular ring in the example being shown. A locking device 16 is provided on an outer circumferential area 14 of the restrictor element carrier 12. This locking device comprises in the example being shown four locking projections 20, which are arranged, for example, at equal angular distances from one another about a central axis M of the flow restrictor element 10, which axis extends at right angles to the drawing plane in FIG. 1, and which extend from an outer edge area 18. At their area that is oriented radially outwardly in relation to the central axis M, the locking projections 20, which extend essentially such that they are oriented essentially axially, have a locking meshing area 22, which is U-shaped in the example being shown. This area can mesh with a recess of an opposite locking device, which has, for example, a complementary shape, on the duct wall of a flow duct, so that the flow restrictor element 10 can be held firmly by the locking device 16 on an inner circumferential surface of the duct wall or of the flow duct.

Figure 1:
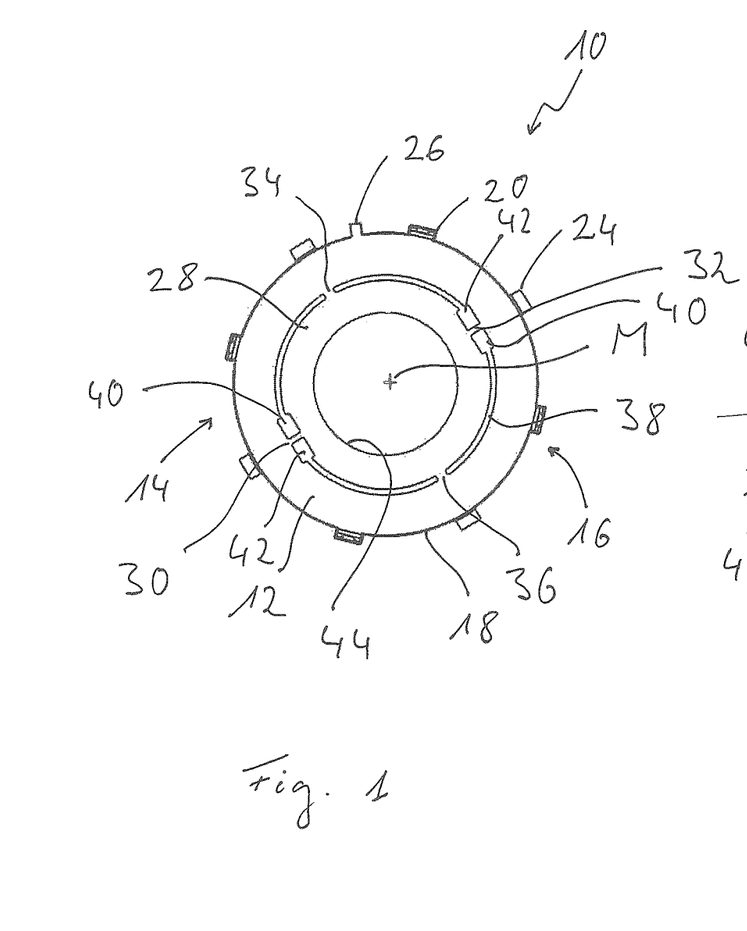
FIG. 1 is an axial view of a flow restrictor element.

A plurality of axially extending stop elements 24 may be provided, for example, with equal angular pitch, from the radially outer edge area 18 of the restrictor element carrier 12. These can be used, when the flow restrictor element 10 is inserted into a flow duct, which is, for example, of a tubular design, to preset a defined axial positioning by cooperating with an opposite stop, which may be designed such that it extends radially inwardly from the duct wall, and to ensure that the flow restrictor element cannot be pushed farther into the flow duct. This is especially helpful if an exact circumferential orientation of the locking meshing areas 22 with the corresponding recesses of the opposite locking device is not preset at first. A defined axial positioning can then be achieved first and the locking projections 20 can be caused to be aligned with the corresponding recesses of the opposite locking device by rotating the flow restrictor element 10 in the flow duct. However, the defined circumferential orientation may also be brought about or imposed by providing at the radially outer edge area 18 a positioning projection 26, which extends, for example, radially outwardly, and which can be positioned such that it meshes with a corresponding positioning recess on the flow duct, so that it is ensured that the locking projections 20 of the locking device 16 are aligned with the corresponding recesses of the opposite locking device in the circumferential direction as well.

It should be noted in this connection that the flow duct may comprise, for example, a duct connection, which defines the downstream end of the flow duct and may be designed with the design measures mentioned above for interaction with the flow restrictor element 10. Associated with such a duct connection or flow duct, a discharge diaphragm, which is provided in an interior space of the vehicle and is visually recognizable, and which may have, for example, a plurality of lamellae that are also oriented or can be positioned for generating a flow deflection, may be provided, in order thus to guarantee that the air flow being discharged can reach an area of the interior space of a vehicle that is intended for it.

A restrictor element 28, which likewise has a ring-shaped design, is provided radially within the ring-shaped restrictor element carrier 12. This element is connected with the restrictor element carrier 12 by connection webs 30, 32, 34, 36 at four circumferential areas, which are positioned, for example, at an angular distance of 90° in relation to one another. Provisions may in this case be made, in particular, for providing, for example, the entire flow restrictor element 10 with the restrictor element carrier 12, with the locking projections 20, with the axial stops 24 and with the positioning projection 26 as well as with the restrictor element 28 and with the connection webs 30, 32, 34, 36 connecting these with the restrictor element carrier 12 as an integral component, preferably one made of plastic. This component has, especially with the restrictor element carrier 12 and with the restrictor element 28, a basically disk-shaped and ring-shaped closed configuration, which is oriented essentially centrally towards the central axis M. In particular, the ring-shaped restrictor element carrier 12 and the likewise ring-shaped restrictor element 28 are arranged concentrically to the central axis M.

Figure 3:
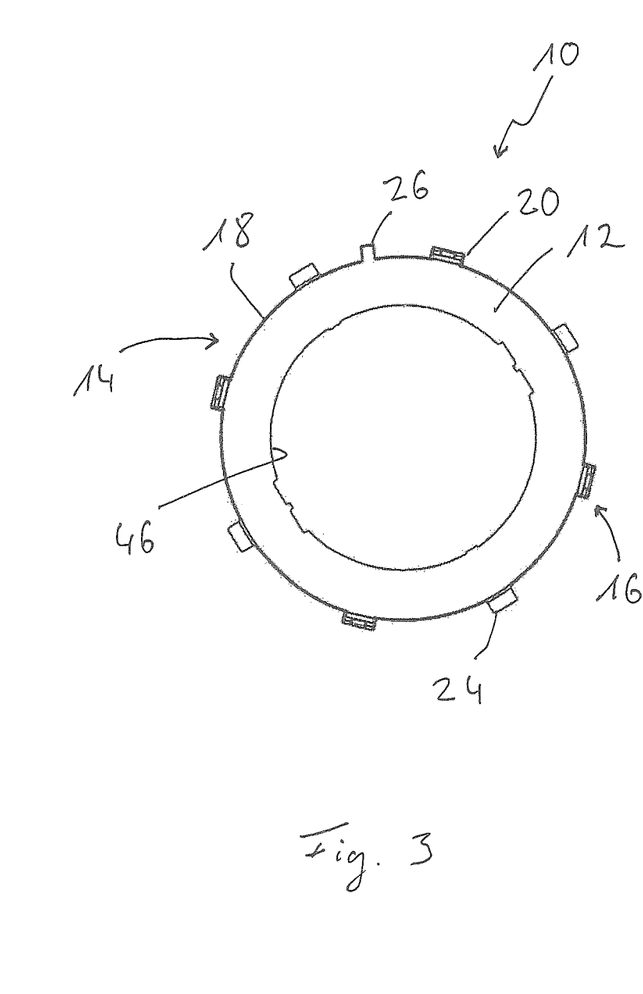
FIG. 3 is the view of a restrictor element carrier of the flow restrictor element according to FIG. 1, which view corresponds to FIG. 1, without a restrictor element provided thereon.
Figure 4:
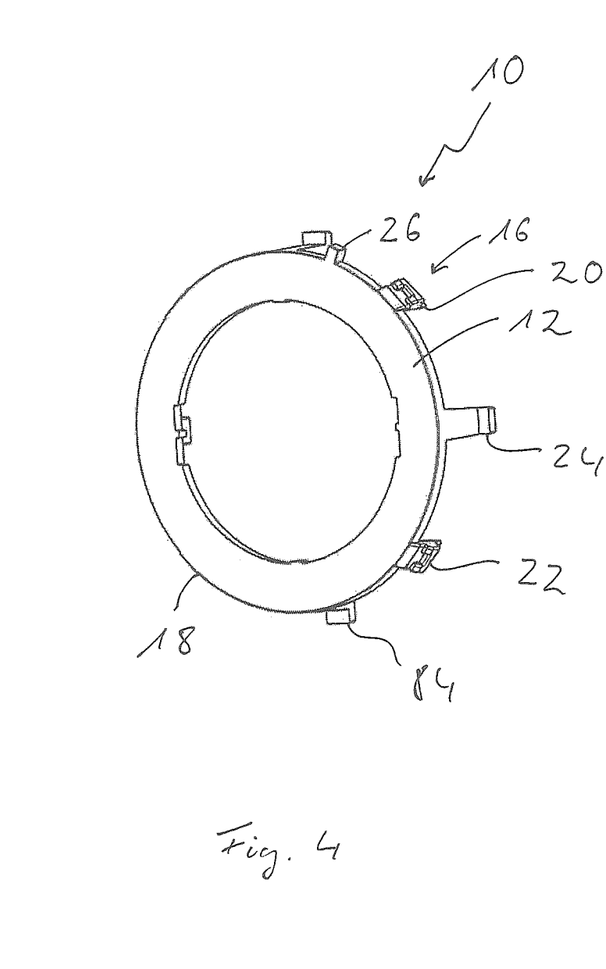
FIG. 4 is a perspective view of the restrictor element carrier according to FIG. 3.

Due to the connection webs 30, 32, 34, 36 being provided, a gap-like intermediate space 38 divided into a plurality of segments is formed between the restrictor element carrier 12 and the restrictor element 28. This intermediate space 38 is radially expanded in the areas adjoining the connection webs 30, 32 arranged diametrically opposite each other, so that a cutting tool insertion opening 40, 42 each is formed in the circumferential direction on both sides of these connection webs 30, 32. For example, the two jaws of pliers can be inserted into these cutting tool insertion openings 40, 42 in order to cut the connection webs 30, 32 and to destroy them thereby by pinching together. After the connection webs 30, 32 have been cut, the restrictor element 28 is still connected with the restrictor element carrier 12 via the two connection webs 34, 36, which are likewise located diametrically opposite each other. These two connection webs 34, 36 thus define a pivot axis, about which the restrictor element 28 can be rotated in relation to the restrictor element carrier 12, and these two connection webs 34, 36 are also destroyed (cut through) in this case, so that the restrictor element 28 can be completely detached from the restrictor element carrier 12. This state is shown in FIGS. 3 and 4.

Figure 2:
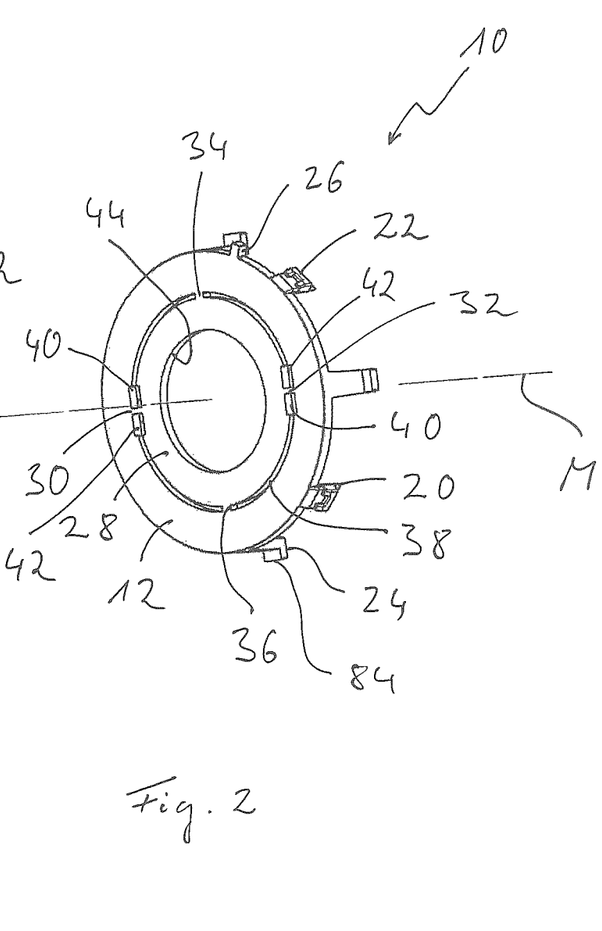
FIG. 2 is a perspective view of the flow restrictor element according to FIG. 1.

Depending on the extent to which a flow duct of an air duct system shall be restricted for generating a certain flow characteristic, the flow restrictor element 10 may be installed either in the configuration shown in FIGS. 1 and 2, in which the restrictor element 28 is provided at the restrictor element carrier 12, so that a cross-sectional area that is free for flow is essentially defined by an inner opening 44 of the restrictor element 28. Air can also pass through the intermediate space 38, the cutting tool insertion openings 40, 42 and possibly a gap-like intermediate space between the radially outer edge area 18 and the inner circumferential surface of the duct wall, so that the restriction can also be affected by a defined presetting of the overall cross-sectional area of these open areas. If only a low degree of restriction is necessary, the restrictor element 28 can be removed from the restrictor element carrier 12 in the above-described manner, so that this carrier can be inserted into the flow duct in its configuration shown in FIGS. 3 and 4 and the cross-sectional area that is free for flow is now defined essentially by the inner opening 46 of the restrictor element carrier 12.

Besides the fact that the flow restrictor element 10 can be manufactured in a technologically simple manner, this element also has the essential advantage that regardless of the extent to which flow restriction shall be preset, an essentially central flow is achieved through said element. The consequence of this is that flow is likewise possible essentially centrally through the flow duct carrying the flow restrictor element 10. As a consequence of this, a highly uniform air flow, which is not oriented in an undesired direction, can likewise be provided into the interior space of a vehicle in a discharge unit, which is positioned, for example, close to the flow restrictor element 10.

A modified embodiment of a flow restrictor element is shown in FIGS. 5 through 8. Components or assembly units, which corresponding to components or assembly units described above, are designated by the same reference numbers in this case, with an "a" added.

The restrictor element carrier 12a of this flow restrictor element 10a corresponds, concerning its embodiment, essentially to the restrictor element carrier described above with reference to FIGS. 1 through 4. This carrier also has, on its outer circumferential area 14a, the locking device 16a with its locking projections 20a extending essentially axially from the outer edge area 18a. The axial stops 24a as well as the positioning projection 26a are provided likewise as well. The restrictor element 28a is detachably connected to the restrictor element carrier 12a via connection webs 30a, 32a, 34a, 36a, and cutting tool insertion openings 40a, 42a are associated, for example, with the two connection webs 30a, 32a located diametrically opposite each other here as well.

An additional restrictor element 48a, likewise provided, for example, with an annular shape, is likewise provided, for example, radially within the restrictor element 28a. This element is detachably connected to the restrictor element 28a via connection webs 50a, 52a, which are diametrically opposite each other, as well as via connection webs 54a, 56a, which are likewise located diametrically opposite each other. These four connection webs 50a, 52a, 54a, 56a may be arranged at an angular distance of 90° in relation to one another in this case as well. Cutting tool insertion openings 58a, 60a, which may be provided as radial expansions of a gap-like intermediate space 62a formed between the two restrictor elements 28a, 48a, may, in turn, be associated with the two connection webs 50a, 52a arranged diametrically opposite each other on both circumferential sides of said connection webs.

Figure 5:
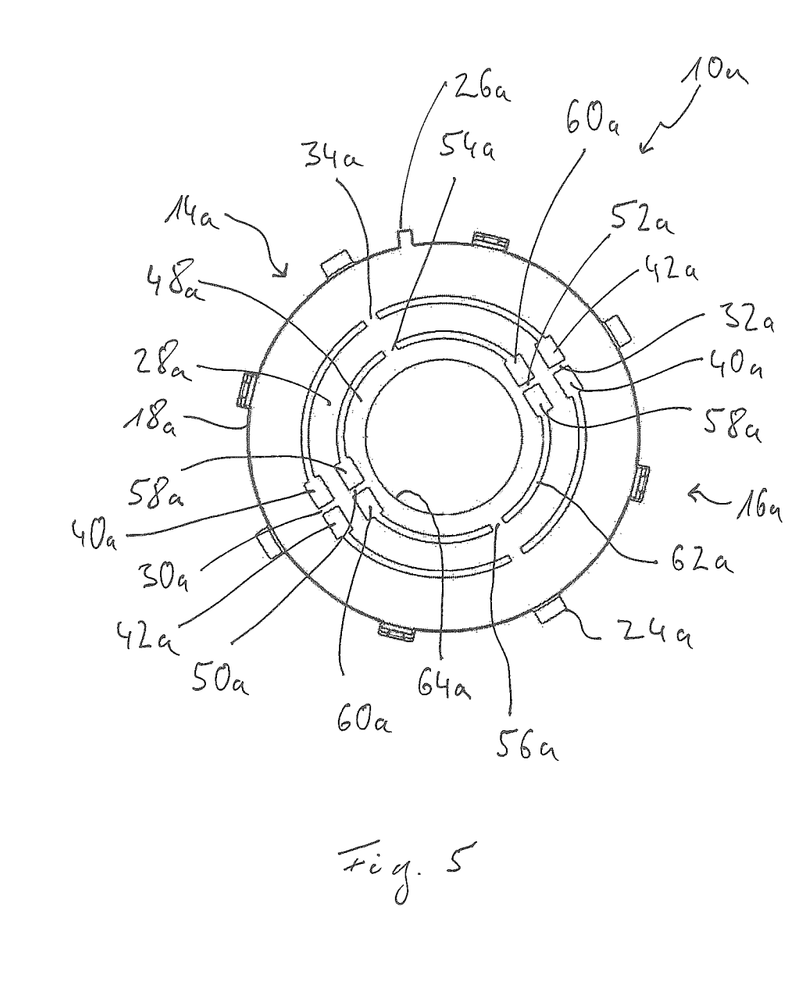
FIG. 5 is an axial view of a flow restrictor element according to an alternative embodiment.
Figure 6:
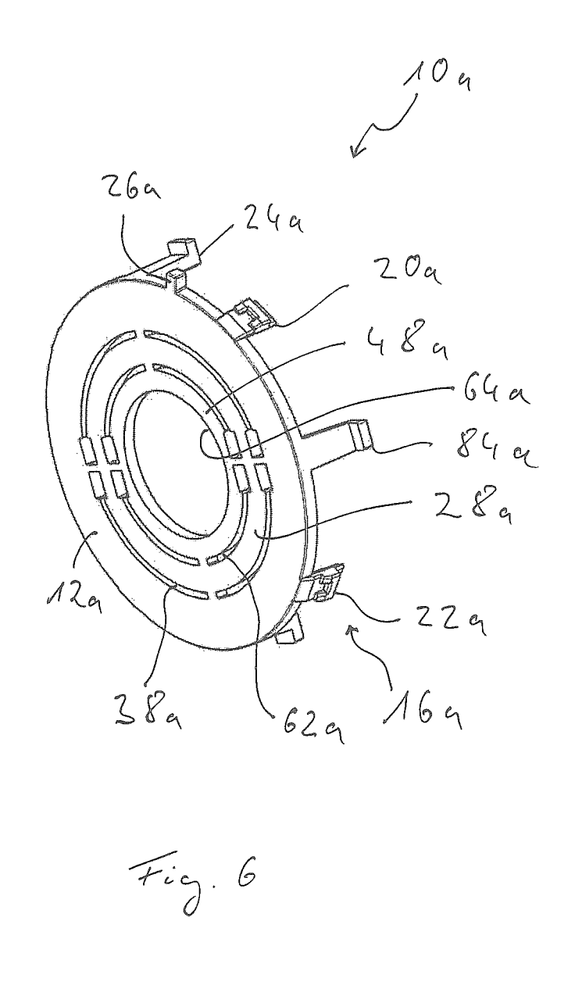
FIG. 6 is a perspective view of the flow restrictor element according to FIG. 5.
Figure 7:
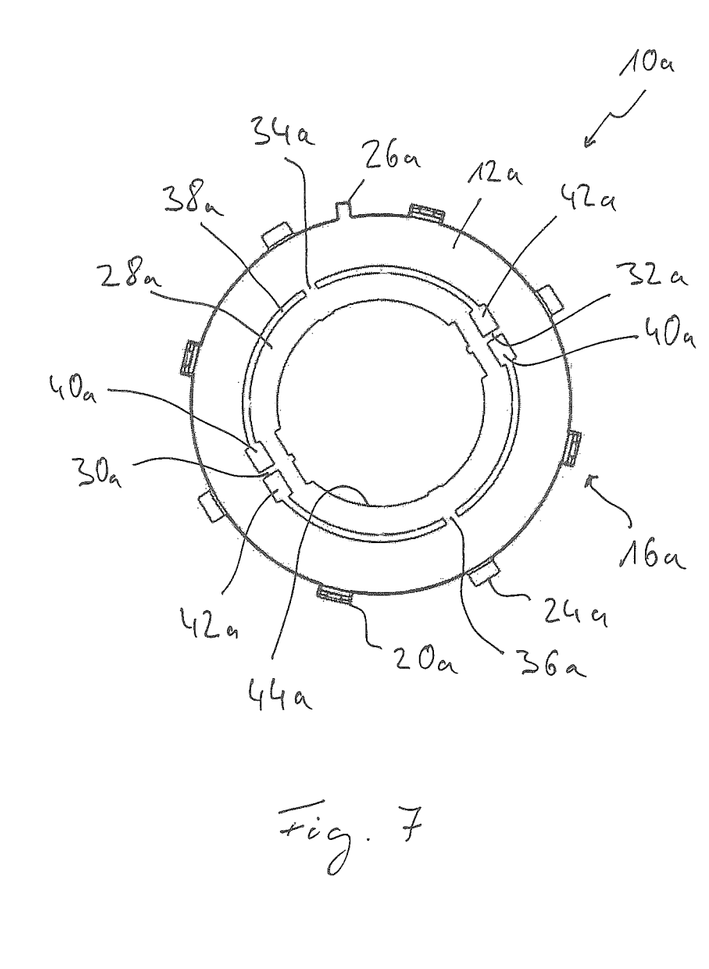
FIG. 7 is the flow restrictor element according to FIG. 5 with a restrictor element detached from it.
Figure 8:
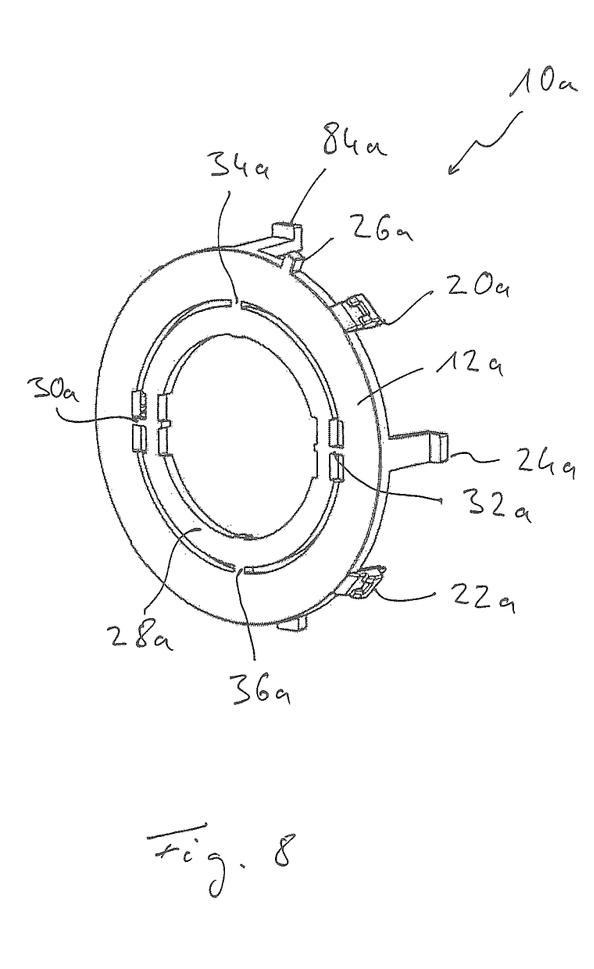
FIG. 8 is the flow restrictor element according to FIG. 5 with a restrictor element detached from it.
Figure 9:
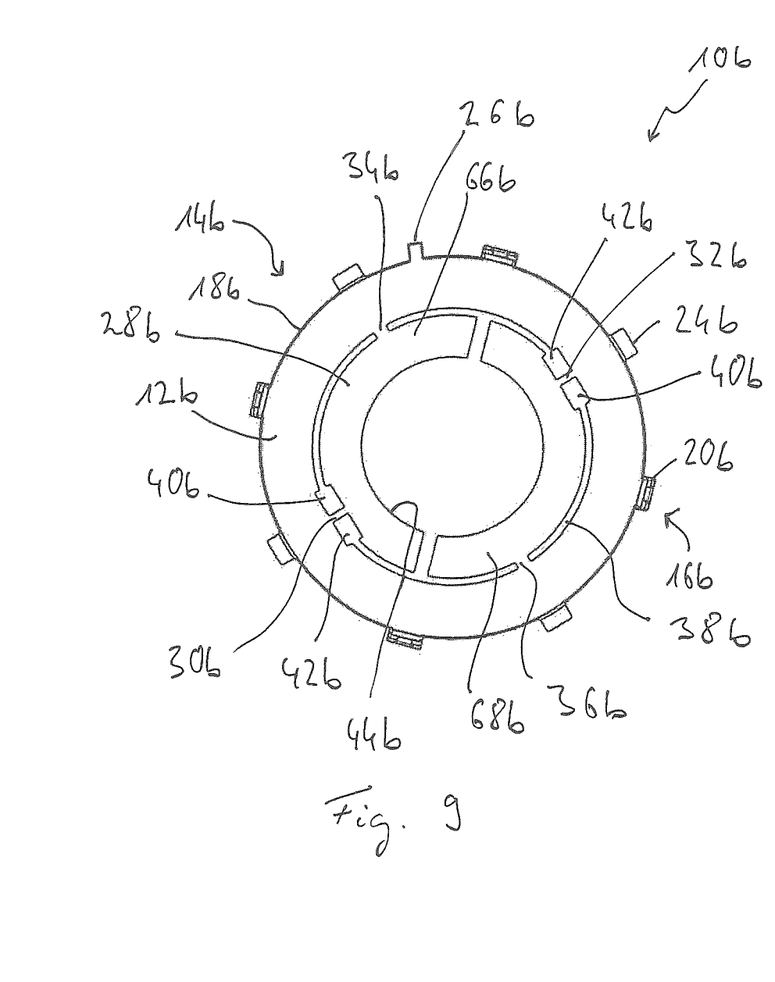
FIG. 9 is an axial view of a flow restrictor element according to an alternative embodiment.
Figure 10:
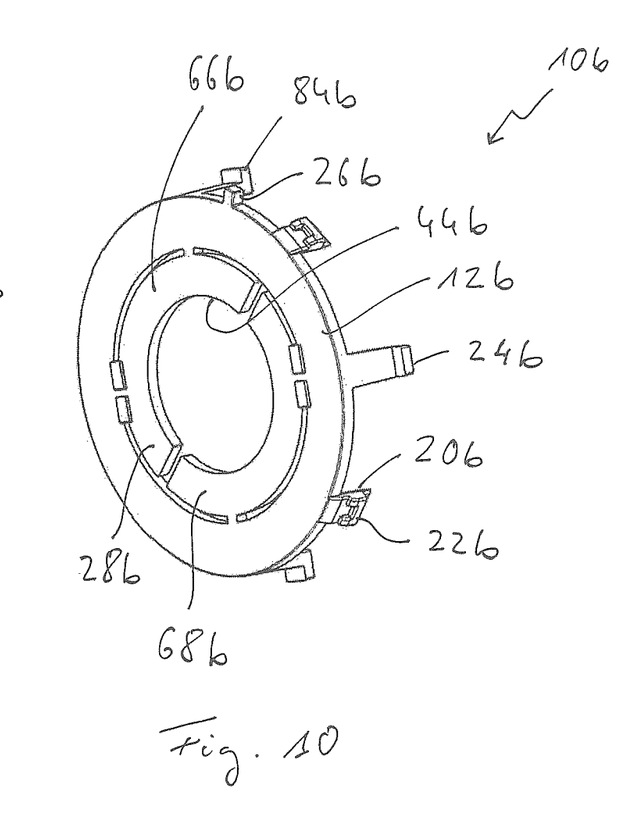
FIG. 10 is a perspective view of the flow restrictor element according to FIG. 9.

The flow cross-sectional area available is defined in the flow restrictor element 10a shown in FIGS. 5 and 6 by the inner opening 64a of the inner one of the two restrictor elements 28a, 48a located in a radially staggered manner. A finer setting of the restricting cross-sectional area or of the cross-sectional area released for flow in a flow duct can be achieved in case of such a design of the flow restrictor element 10a with a plurality of restrictor elements 28a, 48a positioned in a radially staggered manner within the restrictor element carrier 12a. For example, as is shown in FIGS. 7 and 8, the radially inner one of the two restrictor elements 28a, 48a can be removed from the flow restrictor element 10a by destroying the connection webs 50a, 52a, 54a, 56a, so that the cross-sectional area that is free for flow is defined in this state essentially by the inner opening 44a of the restrictor element 28a. If an even larger flow cross-sectional area shall be released, this restrictor element 28a may also be removed from the restrictor element carrier 12a.

FIGS. 5 and 6 show that the connection webs 50*a*, 52*a*, 40*a*, 42*a*, with which respective cutting tool insertion openings 58*a*, 60*a* as well as 40*a*, 42*a* are associated, can be positioned in the same circumferential area, just like the connection webs 54*a*, 56*a* as well as 34*a*, 36*a*, with which no such cutting tool insertion openings are associated. The configuration could, of course, also be different, so that a circumferential offset of connection webs with cutting tool insertion openings can be brought about at the different transitions. The connection webs associated with different radial transitions also do not necessarily have to be positioned each in the same circumferential area.

Another alternative embodiment is shown in FIGS. 9 through 12. Components or assembly units which correspond to components and assembly units described above in terms of function and design are designated by the same reference numbers with the addition of a "b" in this case.

The restrictor element carrier has the design described above with reference to FIGS. 1 through 4 in the flow restrictor element 10*a* shown in FIGS. 9 through 12 as well, so that reference may be made to these explanations.

On its radially inner area, the restrictor element carrier 12*a* carries the restrictor element 28*b*, which is designed with two circle segment-like or ring segment-like restrictor element segments 66*a*, 68*b* in this exemplary embodiment. Each of these restrictor element segments 66*a*, 68*b* is connected to the restrictor element carrier 12*b* by two connection webs 30*b*, 34*b* as well as 32*b*, 36*b*. The two cutting tool insertion openings 40*a*, 42*b*, which are arranged adjoining the connection webs 30*b* and 32*b* in the circumferential direction, are associated with one each of these two connection webs 30*b* and 32*b*. The restrictor element segments 66*b*, 68*b* could also be connected with one another by connection webs.

Figure 11:
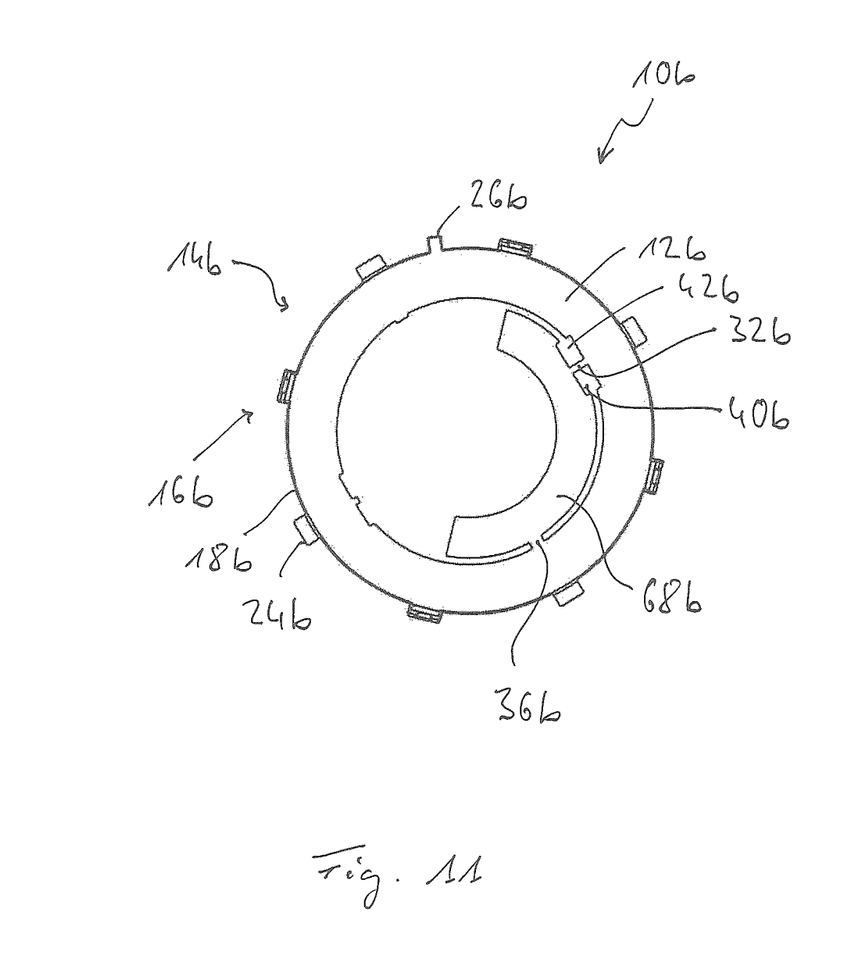
FIG. 11 is the flow restrictor element according to FIG. 9 with a restrictor element segment detached from it.
Figure 12:
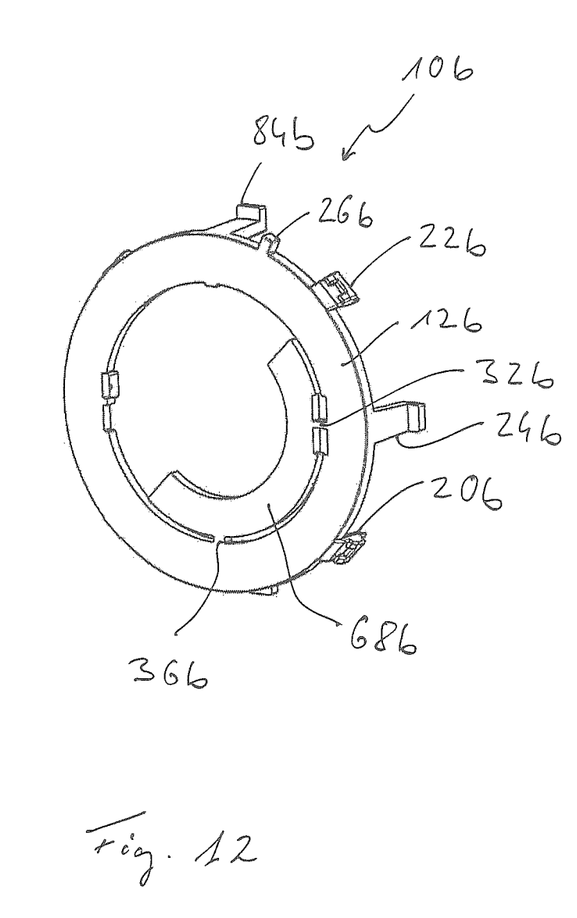
FIG. 12 is a perspective view of the flow restrictor element according to FIG. 11.

Depending on the extent to which a flow restriction shall take place, the same restrictor element 28*b* with its two restrictor element segments 66*a*, 68*b* could be removed from the restrictor element carrier 12*b*. For example, the connection web 30*b* or 32*b*, respectively, can at first be cut for this again, for example, with a cutting tool, and complete detachment can then be achieved by rotating the restrictor element segments 66*a*, 68*b* about the connection webs 34*b*, 36*b* by destroying these connection webs 34*b*, 36*b* as well. If only a low degree of restriction shall be achieved, the restrictor element segment 66*a* can be removed in this case, as this is shown in FIGS. 11 and 12, while the other restrictor element segment 68*b* of the restrictor element 28*b* remains at the restrictor element carrier 10*b*.

It should be noted that it would, of course, also be possible to provide a different division of the restrictor elements 28*b*. For example, it could thus be divided into more than two restrictor element segments. Furthermore, the restrictor element segments, into which the restrictor element 28*b* is divided, could have different sizes, e.g., a different circumferential extension, in order to make possible a variation in the extent to which the flow cross section or the restriction cross-sectional area is affected in this respect as well. The segmenting of the restrictor elements can, of course, also be achieved if, as is shown in FIGS. 5 through 8, a plurality of restrictor elements are arranged in a radially staggered pattern. These radially staggered restrictor elements may be segmented here in the same manner relative to one another, so that intermediate spaces separating the segments are located in the same circumferential area in all or a plurality of restrictor elements arranged in a radially staggered pattern. As an alternative, these intermediate spaces could also be offset in the circumferential direction in relation to one another, so that, for example, a restrictor element segment of a restrictor element positioned radially farther inwardly bridges over an intermediate space between two restrictor element segments of a restrictor element adjoining it radially on the outside and is connected to these two restrictor element segments by at least one connection web each. This leads to a stable design of a flow restrictor element, in which a plurality of restrictor element segments of different restrictor elements, which said segments follow each other in the circumferential direction and are also positioned in a radially staggered pattern, are provided.

A configuration in which the cross-sectional area essentially released for flow is located centrally in a flow duct, is also created by separating individual restrictor element segments, so that a comparatively uniform discharge of, for example, the air to be introduced into the interior space of the vehicle is achieved in a discharge unit now following in the downstream direction.

Figure 13:
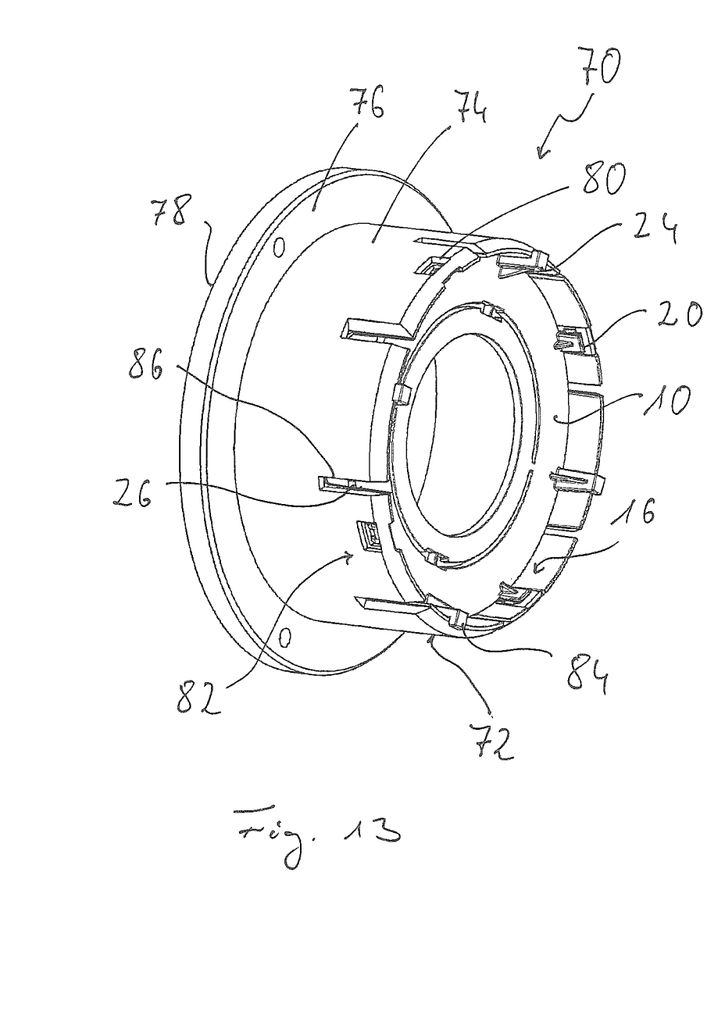
FIG. 13 is a duct connection of an air duct system with a flow restrictor element locked on it.
Figure 14:
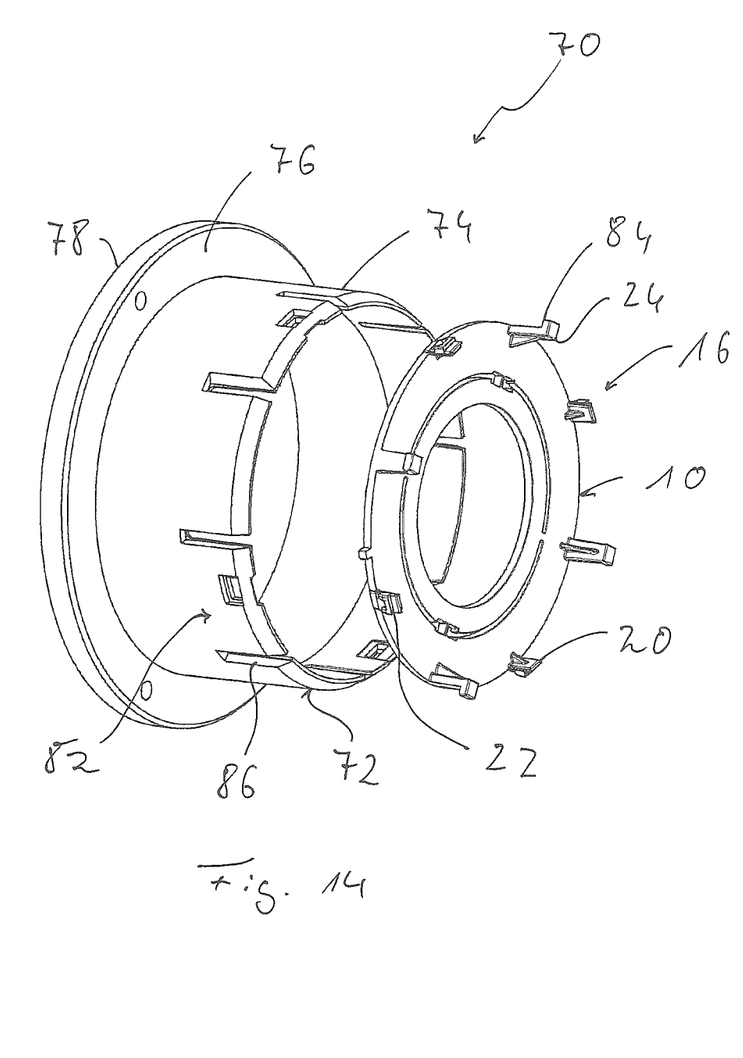
FIG. 14 is an exploded view of the assembly unit according to FIG. 13.

FIGS. 13 and 14 show a discharge assembly unit generally designated by 70, in which a duct connection 72 of a flow guide duct of an air duct system is provided with a flow restrictor element, here, for example, with the flow restrictor element 10 shown in FIGS. 1 and 2. It should be noted that one of the other above-described flow restrictor elements may, of course, also be used with the many different possibilities of varying the restriction cross section, which possibilities are also described in this connection.

The duct connection 72 comprises a duct wall 74, which defines a partial area of a flow duct and from which a flange area 76 extends radially outwardly. The duct connection 72 can be fixed with this flange area 76, for example, to a wall defining an interior space of a vehicle by screw connection or the like. A discharge diaphragm 78, which covers the opening provided in the duct connection 72 towards the interior space of the vehicle and may have one or more flow guide elements, for example, lamellae or the like, in order to be able to guide the air flow in a defined direction, may also be fixed on the flange area 76, for example, by locking.

A plurality of recesses 80 of the opposite locking device 82, distributed in the circumferential direction, are recognized in the duct wall 74. In the state of assembly of the discharge assembly unit 70 shown in FIG. 13, the locking meshing areas 22 of the locking projections 20 can mesh with or snap in these recesses 80 in order thus to lock the flow restrictor element 10 on the duct wall 74 or the duct connection 72.

In the locked state, the stop elements 24 of the flow restrictor element 10 are in contact, with stop sections 84 extending radially outwardly, with the axial end area of the duct connection 72 or the duct wall 74 or are located at a short axial distance therefrom. The stop elements 24 thus ensure that the flow restrictor element 10 cannot be inserted too far into the duct connection 72.

A defined circumferential positioning can be brought about during the insertion of the flow restrictor element 10 into the duct connection 72 by the interaction of the positioning projection 26 with one of the positioning recesses 86 provided, which are distributed over the circumference. These axially open positioning recesses 86 are arranged such that it is guaranteed, regardless of the particular positioning recess into which the positioning projection 26 is inserted, that the locking projections with their locking meshing areas 22 are aligned with the recesses 80 of the opposite locking device 82 in the circumferential direction.

After inserting the flow restrictor element 10 into the duct connection 72, the latter can be inserted, for example, from an interior space of the vehicle, into an associated opening of a wall defining the interior space, a dashboard or the like and fixed thereto. Another area of the flow guide duct, designed, for example, as a tube or flexible corrugated tube or the like, can then be pushed over the duct wall 74 on the side facing away from the interior space and locked there with a pipe clamp or/and by frictional press fit.

As was already described above, a suitable flow restrictor element with the necessary number of restrictor elements can be provided in the duct connection 72 depending on the extent to which flow restriction shall be provided at a discharge point or in a discharge assembly unit 70.

Figure 15:
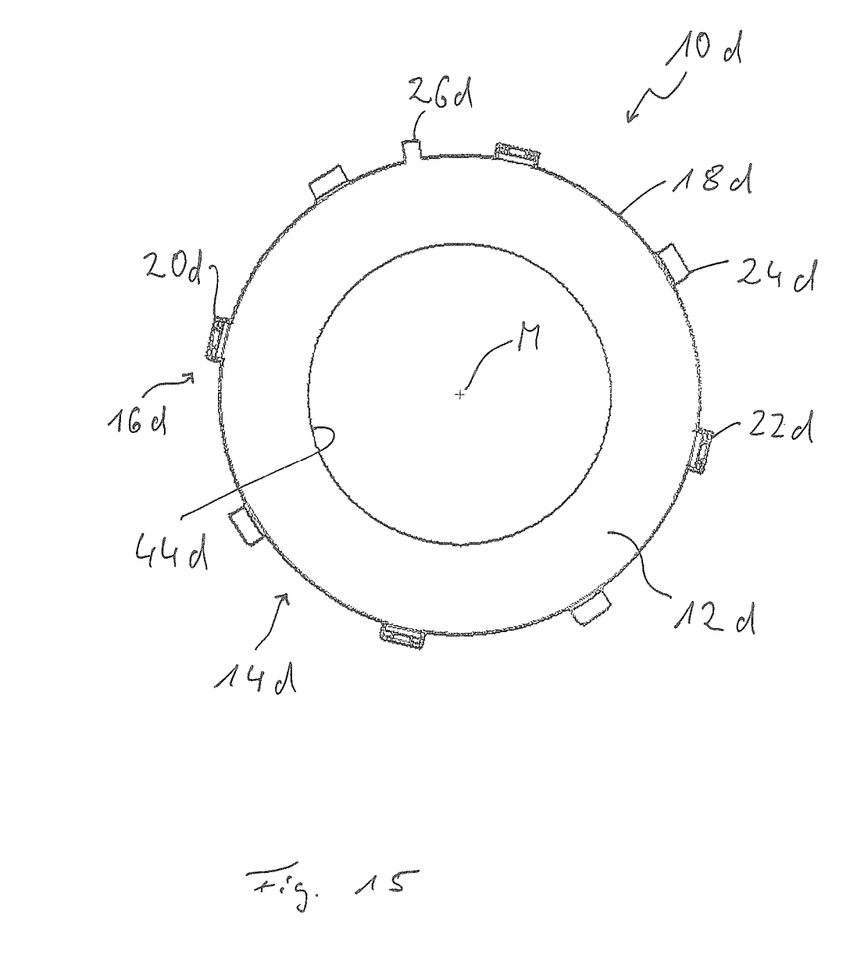
FIG. 15 is an axial view of a flow restrictor element according to an alternative embodiment.
Figure 16:
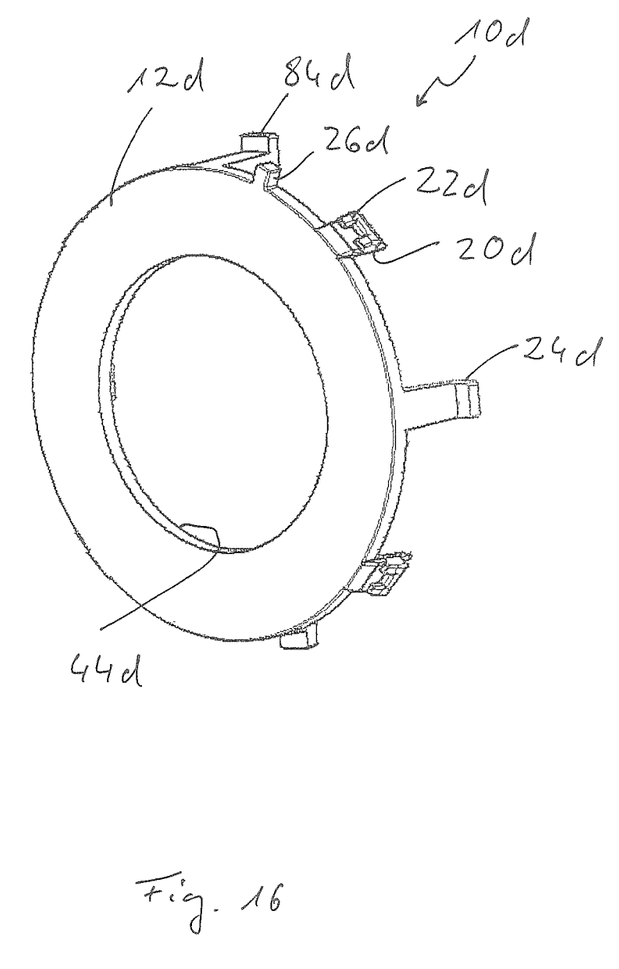
FIG. 16 is a perspective view of the flow restrictor element according to FIG. 15.
Figure 17:
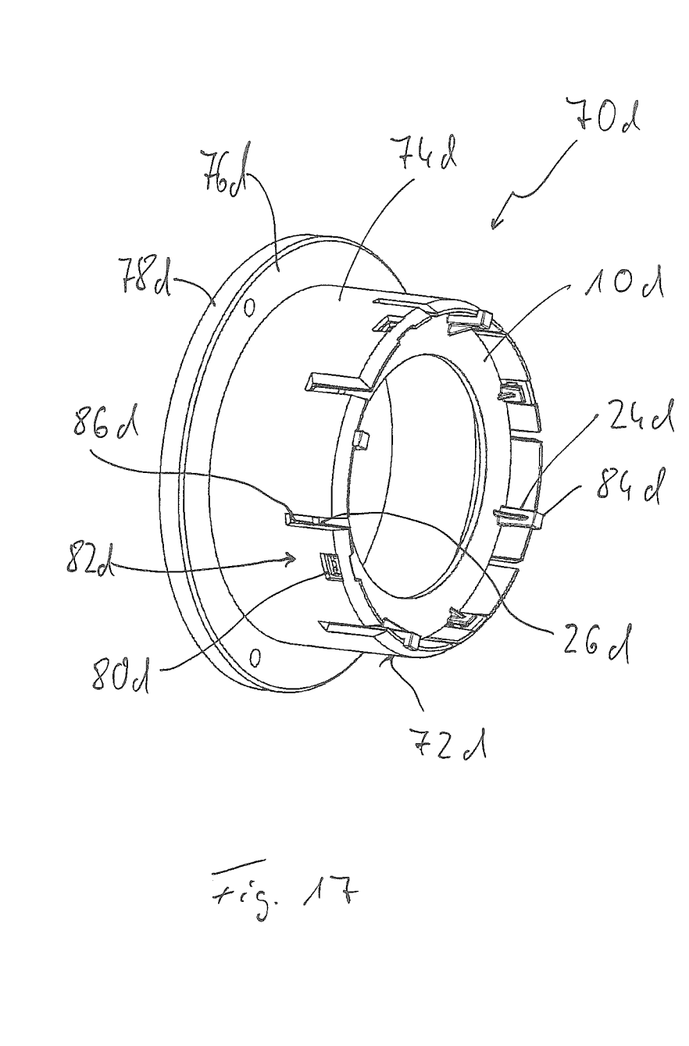
FIG. 17 is a duct connection of an air duct system with a flow restrictor element according to FIG. 15 locked on it.
Figure 18:
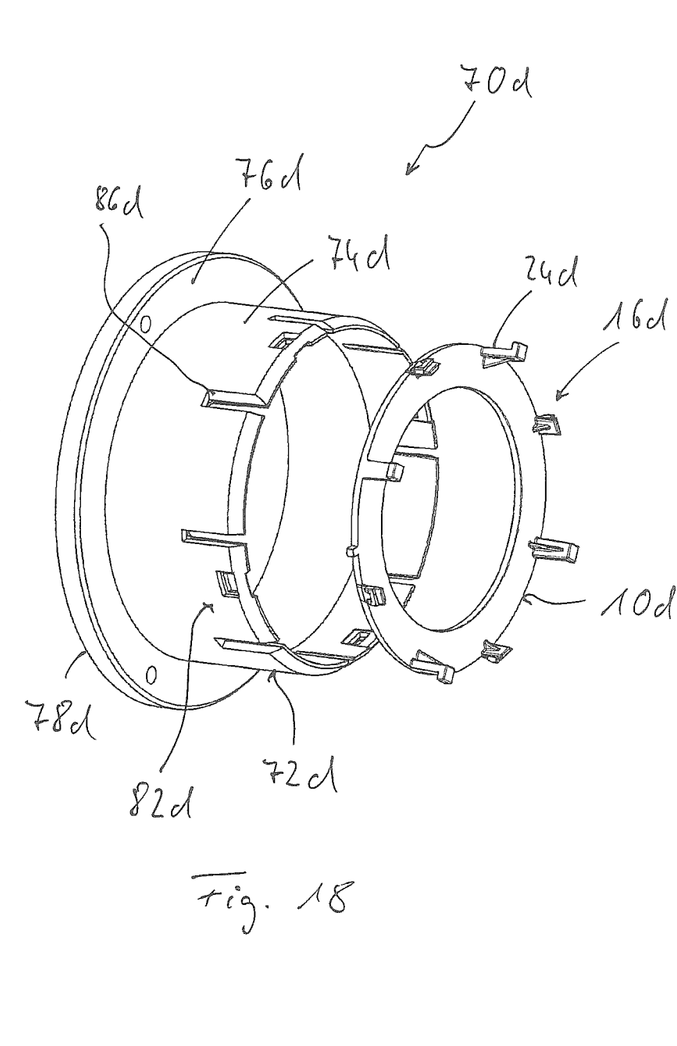
FIG. 18 is an exploded view of the assembly unit according to FIG. 17.

An alternative type of embodiment of a flow restrictor element is shown in FIGS. 15 and 16. Components and areas which correspond to above-described components and areas of the flow restrictor elements according to FIGS. 1 through 12 are designated by the same reference numbers with a "d" added.

The flow restrictor element 10*d* shown in FIGS. 15 and 16 comprises a ring-shaped restrictor element body 12*d*, which may correspond in respect to its basic design, for example, to the restrictor element carrier described with reference to FIGS. 1 through 4. The locking projections 20*a*, the stop elements 24*d* as well as the positioning projection 26*d* extend on the outer circumferential area 14*d* of the restrictor element body 12*d* in the above-described manner.

The restrictor element body 12*d* having a ring-shaped design has an opening 44*d*, which is arranged preferably centered in relation to the central axis M thereof and through which the air being guided in a flow guide duct can flow.

The flow restrictor element 10*d* shown in FIGS. 15 and 16 is designed basically such that it cannot provide a variable restriction cross section itself. Provisions may rather be made for selecting a flow restrictor element 10*d* with a cross section of the opening 44*d* being adapted to it depending on the extent of restriction to be provided in a discharge assembly unit or in a flow guide duct; thus, the opening 44*d* can be provided with a smaller opening cross section, which means that the radial extension of the restrictor element body 12*d* becomes larger. If a weaker restriction shall be generated, the opening 44*d* can be provided with a correspondingly larger cross-sectional dimension.

Since such flow restrictor elements 10*d* can be made of plastic in a cost-effective manner, flow restrictor elements 10*d* with many different dimensions can be provided to make it possible to generate the desired restriction in this manner when building an air duct system.

It should be noted that the different variations explained above concerning the shape, especially concerning the cross-sectional geometry, can be used in this flow restrictor element 10*d* as well. Provisions could, of course, also be made for dividing the opening 44*d*, which is arranged, e.g., centrally in the case being shown, into a plurality of partial openings, or for providing a plurality of individual openings provided over the cross-sectional area of the flow restrictor element 10*d*.

In a manner corresponding to FIGS. 13 and 14, FIGS. 7 and 18 show a discharge assembly unit 70*d* with a duct connection 72*d* and with the flow restrictor element 10*d* shown in FIGS. 15 and 16. The flow restrictor element 10*d* with its locking projections 20*d* can be locked on the duct wall 74*d* in the manner described above with reference to FIGS. 13 and 14. It is seen that the duct connection 72*d* has a design identical to that of the duct connection 72 shown in FIGS. 13 and 14, so that this is equally suitable for cooperation with each of the above-described flow restrictor elements.

It should be noted that different variations may be made in the above-described embodiments of a flow restrictor element. For example, the geometry of the restrictor element body or of the restrictor element carrier and even of the restrictor elements being carried thereon may be provided in adaptation to the inner cross-sectional geometry of a flow duct. In case of an oval or elliptical cross-sectional geometry, the restrictor element carrier/body, which is also provided in a ring-shaped form now, may be correspondingly of an oval or elliptical shape. With a likewise ring-shaped form, the restrictor element carrier/body may correspondingly also have a polygonal shape in adaptation to, for example, a polygonal cross-sectional contour of a flow duct. The restrictor element carrier/body itself could also be open in a circumferential area, i.e., formed with an open ring shape, even though the closed ring shape shown in the figures is advantageous because of the more stable connection to a flow duct. Further, it is obvious that the flow restrictor element, designed, in principle, with a disk-like shape, could also be provided, for example, with a configuration differing from a flat disk, for example, with a conical or truncated cone-shaped configuration, as a result of which the flow characteristics in a flow duct can be additionally affected.

While specific embodiments of the invention have been shown and described in detail to illustrate the application of the principles of the invention, it will be understood that the invention may be embodied otherwise without departing from such principles.

What is claimed is:

1. A flow restrictor element for restricting air flow in an air duct system of a vehicle, the flow restrictor element comprising:

a ring-shaped restrictor element carrier to be arranged on a flow guide duct of the air duct system;

a plurality of ring-shaped restrictor elements arranged radially within the restrictor element carrier in relation to a central axis of the flow restrictor element and detachable from the restrictor element carrier for changing a restriction cross-sectional area;

a locking device provided on an outer circumferential area of the restrictor element carrier for locking the restrictor element carrier on the flow guide duct, the restrictor elements being arranged in a radially staggered pattern, a radially outermost of the restrictor elements being radially separated from the restrictor element carrier by a ring-shaped intermediate space and being detachably connected with the restrictor element carrier by a plurality of radially extending connection webs radially bridging the intermediate space formed between the restrictor element carrier and the radially outermost restrictor element, wherein each one of the restrictor elements that is arranged farther radially inwardly than the radially outermost restrictor element is radially separated from an adjacent one of the restrictor elements located adjacent to that restrictor element radially on an outside thereof by another ring-shaped intermediate space and is detachably connected with the adjacent one of the restrictor elements located adjacent to that restrictor element radially on an outside thereof by another plurality of radially extending connection webs radially bridging the another ring-shaped intermediate space formed between that restrictor element and the adjacent restrictor element located adjacent to that restrictor element radially on the outside thereof, each connection web providing a predetermined breaking point that can be cut, wherein the restrictor element carrier with the locking device and each one of the restrictor elements and each one of the connection webs are formed integrally with a plastic material, wherein cutting tool insertion openings are provided on both circumferential sides of at least one connection web of the plurality of radially extending connection webs and cutting tool insertion openings are provided on both circumferential sides of at least one connection web of the another plurality of radially extending connection webs, each cutting tool insertion opening provided on one of the two circumferential sides of the at least one of the connection webs of the plurality of radially extending connection webs having cutting tool insertion openings on both circumferential sides thereof being provided by a radial expansion of the intermediate space, and each cutting tool insertion opening provided on one of the two circumferential sides of the at least one of the connection webs of the another plurality of radially extending connection webs having cutting tool insertion openings on both circumferential sides thereof being provided by a radial expansion of the another intermediate space radially bridged by the at least one of the connection webs of the another plurality of radially extending connection webs having cutting tool insertion openings on both circumferential sides thereof, wherein at least one of:
  the radially outermost restrictor element is connected with the restrictor element carrier by at least one connection web of the plurality of radially extending connection webs having cutting tool insertion openings associated therewith on both circumferential sides thereof and by at least one connection web of the plurality of radially extending connection webs without having any cutting tool insertion opening associated therewith; and
  the radially outermost restrictor element is connected with the restrictor element arranged farther radially inwardly by at least one connection web of the another plurality of radially extending connection webs having cutting tool insertion openings associated therewith on both circumferential sides thereof and by at least one connection web of the another plurality of radially extending connection webs without having any cutting tool insertion opening associated therewith.

2. The flow restrictor element in accordance with claim 1, wherein:
  the locking device comprises a plurality of locking projections formed as snap-in projections, extending from the restrictor element carrier; and
  each locking projection comprises on a side thereof that is to be positioned facing the flow guide duct a locking engagement area to be positioned to mesh with a locking recess.

3. The flow restrictor element in accordance with claim 2, wherein the locking projections extend from an outer edge area of the restrictor element carrier radially outwardly or/and in the direction of the central axis.

4. The flow restrictor element in accordance with claim 1, wherein the restrictor element carrier has, at least in some areas, a rounded ring shape in the form of one of a circular ring, an elliptical ring and an oval shaped ring, each of the ring-shaped intermediate space and the another ring-shaped intermediate space being defined in a circumferential direction with respect to the central axis of the flow restrictor element.

5. The flow restrictor element in accordance with claim 1, wherein at least one of the restrictor elements has a ring-shaped design corresponding to a ring-shaped design of the restrictor element carrier, the radially outermost restrictor element comprising a radially outermost restrictor element circumferential extent extending in a circumferential direction with respect to the central axis of the flow restrictor element, the restrictor element carrier comprising a restrictor element carrier circumferential extent extending in the circumferential direction with respect to the central axis of the flow restrictor element, at least the restrictor element carrier circumferential extent and the radially outermost restrictor element circumferential extent defining the ring-shaped intermediate space.

6. The flow restrictor element in accordance with claim 1, wherein:
  each one of the restrictor elements comprises a plurality of restrictor element segments following each other in a circumferential direction about the central axis;
  the restrictor element segments of the radially outermost restrictor element are connected detachably, independently from one another, with the restrictor element carrier.

7. The flow restrictor element in accordance with claim 1, wherein two of the connection webs with the cutting tool insertion openings associated therewith are provided such that they are located essentially diametrically opposite each other and associated with the radially outermost restrictor element and two connection webs without respective cutting tool insertion openings associated therewith are provided such that they are located essentially diametrically opposite each other and associated with the radially outermost restrictor element.

8. The flow restrictor element in accordance with claim 1, wherein at least one of:
  the restrictor element carrier with each one of the restrictor elements has an essentially disk-shaped design; and
  the restrictor element carrier and each one of the detachably connected restrictor elements are arranged concentrically to the central axis.

9. A flow restrictor element restricting the air flow in an air duct system of a vehicle, the flow restrictor element comprising:
  a ring-shaped restrictor structure comprising a restrictor element carrier to be arranged on a flow guide duct;
  a locking device provided on an outer circumferential area of the restrictor element carrier for locking the ring-shaped restrictor structure on the flow guide duct, the ring-shaped restrictor structure further comprising a plurality of ring-shaped restrictor elements arranged in a radially staggered pattern with respect to a central axis of the flow restrictor element, a radially outermost of the restrictor elements being radially separated from the restrictor element carrier by a ring-shaped intermediate space and the radially outermost of the restrictor elements being detachably connected with the restrictor element carrier by first connection webs radially bridging the intermediate space formed between the restrictor element carrier and the radially outermost of the restrictor elements, each of the first connection webs extending in a radial direction with respect to the central axis of the flow restrictor element, wherein each restrictor element that is arranged farther radially inwardly than the radially outermost of the restrictor elements is detachably connected with an adjacent restrictor element located adjacent to that restrictor element radially on an outside thereof by second connection webs radially bridging another ring-shaped intermediate space formed between that restrictor element and the adjacent restrictor element located adjacent to that restrictor element radially on the outside thereof, each of the second connection webs extending in the radial direction, each of the first connection webs and the second connection webs providing a predetermined breaking point that can be cut to detach at least one associated restrictor element, wherein the restrictor element carrier, the locking device, each restrictor element, each first connection web and each second connection web are formed integrally with a plastic material, at least one of the first connection webs being associated with cutting tool first insertion openings, wherein each of the at least one of the first connection webs defines at least a portion of a respective one of the plurality of cutting tool first insertion openings and each of the at least one of the first connection webs defines at least a portion of another respective one of the cutting tool first insertion openings, at least one of the second connection webs being associated with cutting tool second insertion openings, wherein each of the at least one of the second connection webs defines at least a portion of a respective one of the plurality of cutting tool second insertion openings and each of the at least one of the second connection webs defines at least a portion of another respective one of the cutting tool second insertion openings, wherein each of the cutting tool first insertion openings and the cutting tool second insertion openings has an opening width in the radial direction, each of the intermediate space and the another intermediate space having a space width in the radial direction, the space width being less than the opening width.

10. The flow restrictor element in accordance with claim 9, wherein the locking device comprises a plurality of locking projections formed as snap-in projections, extending from the restrictor structure, wherein each of the locking projections has a locking engagement area to be positioned such that the locking engagement area meshes with a locking recess on a side thereof that is to be positioned such that the locking engagement area faces the flow guide duct.

11. The flow restrictor element in accordance with claim 10, wherein the locking projections extend from an outer edge area of the restrictor structure radially on an outside or/and in a direction of a central axis of the restrictor structure.

12. The flow restrictor element in accordance with claim 9, wherein the restrictor element carrier has, at least in some regions, a rounded ring shape in the form of one of a circular ring, an elliptically shaped ring and an ovally shaped ring.

13. The flow restrictor element in accordance with claim 9, wherein the restrictor element carrier comprises an inner surface extending in a circumferential direction of the restrictor element carrier with respect to the central axis of the flow restrictor element, the inner surface defining a restrictor element space, each of the ring-shaped restrictor elements being located in the restrictor element space, wherein one or more of the first connection webs are not associated with any of the cutting tool first insertion openings and one or more of the second connection webs are not associated with any of the cutting tool second insertion openings.

14. The flow restrictor element in accordance with claim 9, wherein the restrictor element carrier comprises a restrictor element carrier inner surface extending in a circumferential direction of the restrictor element carrier with respect to the central axis of the flow restrictor element, the restrictor element carrier inner surface defining a restrictor element space, one of the ring-shaped restrictor elements being concentrically arranged in the restrictor element space, the one of the ring-shaped restrictor elements having a ring-shaped restrictor element inner space, another one of the ring-shaped restrictor elements being concentrically arranged in the ring-shaped restrictor element inner space, the radially outermost restrictor element comprising a radially outermost restrictor element circumferential extent extending in the circumferential direction with respect to the central axis of the flow restrictor element, the restrictor element carrier inner surface comprising a restrictor element carrier inner surface extent extending in the circumferential direction with respect to the central axis of the flow restrictor element, at least the restrictor element carrier inner surface extent and the radially outermost restrictor element circumferential extent defining the ring-shaped intermediate space, the one of the plurality of cutting tool first insertion openings being located opposite the another one of the cutting tool first insertion openings in the circumferential direction, the one of the plurality of cutting tool second insertion openings being located opposite the another one of the cutting tool second insertion openings in the circumferential direction.

15. The flow restrictor element in accordance with claim 1, wherein the restrictor element carrier comprises an inner surface extending in a circumferential direction of the restrictor element carrier with respect to the central axis of the flow restrictor element, the inner surface defining a restrictor element space, each of the ring-shaped restrictor elements being located in the restrictor element space.

16. The flow restrictor element in accordance with claim 1, wherein the restrictor element carrier comprises an inner surface extending in a circumferential direction of the restrictor element carrier with respect to the central axis of the flow restrictor element, the inner surface defining a restrictor element space, one of the ring-shaped restrictor elements being concentrically arranged in the restrictor element space, the one of the ring-shaped restrictor elements having a ring-shaped restrictor element inner space, another one of the ring-shaped restrictor elements being concentrically arranged in the ring-shaped restrictor element inner space.

17. A flow restrictor element for restricting air flow in an air duct system of a vehicle, the flow restrictor element comprising:
a ring-shaped restrictor element carrier to be arranged on a flow guide duct of the air duct system;
a plurality of ring-shaped restrictor elements arranged radially inward of the restrictor element carrier in relation to a central axis of the flow restrictor element and detachable from the restrictor element carrier for changing a restriction cross-sectional area;
a locking device provided on an outer circumferential area of the restrictor element carrier for locking the restrictor element carrier on the flow guide duct, one of the ring-shaped restrictor elements being arranged radially adjacent and radially inward of another one of the ring-shaped restrictor elements with respect to the central axis, the another one of the ring-shaped restrictor elements defining a radially outermost restrictor element, the radially outermost restrictor element being radially separated from the restrictor element carrier by a ring-shaped intermediate space and being detachably connected with the restrictor element carrier by first connection webs, wherein cutting tool first insertion openings are located between the restrictor element carrier and the radially outermost restrictor element, one of the cutting tool first insertion openings being located adjacent to one side of one of the first connection webs and another one of the cutting tool first insertion openings being located adjacent to another side of the one of the first connection webs, each of the first connection webs extending in a radial direction with respect to the central axis, the one of the cutting tool first insertion openings being located opposite the another one of the cutting tool first insertion openings in a circumferential direction with respect to the central axis, each of the first connection webs radially bridging the intermediate space formed between the restrictor element carrier and the radially outermost restrictor element, each of the cutting tool first insertion openings having a dimension in the radial direction that is greater than a dimension of the intermediate space in the radial direction, the intermediate space being located radially between the restrictor element carrier and the radially outermost restrictor element with respect to the central axis, the plurality of ring-shaped restrictor elements being connected to each other by a plurality of second connection webs, wherein another ring-shaped intermediate space is defined radially, with respect to the central axis, between the radially outermost restrictor element and the one of the ring-shaped restrictor elements, wherein cutting tool second insertion openings are located between the radially outermost restrictor element and the one of the ring-shaped restrictor elements, one of the cutting tool second insertion openings being located adjacent to one side of one of the second connection webs and another one of the cutting tool second insertion openings being located adjacent to another side of the one of the second connection webs, the one of the cutting tool second insertion openings being located opposite the another one of the cutting tool second insertion openings in the circumferential direction, each of the second connection webs extending in the radial direction with respect to the central axis, each of the second connection webs radially bridging the another ring-shaped intermediate space, each of the cutting tool second insertion openings having a dimension in the radial direction that is greater than a dimension of the another ring-shaped intermediate space in the radial direction, each of the first connection webs and each of the second connection webs defining a predetermined breaking point that can be cut to detach at least one associated restrictor element.

18. The flow restrictor element in accordance with claim 17, wherein the restrictor element carrier comprises an inner surface extending in the circumferential direction of the restrictor element carrier with respect to the central axis, the inner surface defining a restrictor element space, the another one of the ring-shaped restrictor elements being concentrically arranged in the restrictor element space, the another one of the ring-shaped restrictor elements having a ring-shaped restrictor element inner space, the one of the ring-shaped restrictor elements being concentrically arranged in the ring-shaped restrictor element inner space, wherein the restrictor element carrier, the locking device, each restrictor element and each connection web are integrally connected with a plastic material to form a one-piece structure, the ring-shaped intermediate space being located radially between the restrictor element carrier and the radially outermost restrictor element with respect to the central axis of the flow restrictor element, the another ring-shaped intermediate space being located radially between the radially outermost restrictor element and the one of the ring-shaped restrictor elements with respect to the central axis of the flow restrictor element, wherein at least one of the first connection webs is not located adjacent to any of the cutting tool first insertion openings and at least one of the second connection webs is not located adjacent to any of the cutting tool second insertion openings.

19. The flow restrictor element in accordance with claim 1, wherein the ring-shaped intermediate space is located radially between the radially outermost restrictor element and the restrictor element carrier with respect to the central axis of the flow restrictor element, the another ring-shaped intermediate space being located radially between the radially outermost restrictor element and one of the restrictor elements located adjacent to the radially outermost restrictor element radially on the inside thereof with respect to the central axis of the flow restrictor element.

20. The flow restrictor element in accordance with claim 18, wherein each of the cutting tool first insertion openings are provided by a radial expansion of the intermediate space radially separating the radially outermost restrictor element and the restrictor element carrier connected to each other by the first connection webs, each of the cutting tool second insertion openings being provided by a radial expansion of the another ring-shaped intermediate space.

* * * * *